US010768904B2

(12) United States Patent
Wenskovitch, Jr. et al.

(10) Patent No.: US 10,768,904 B2
(45) Date of Patent: Sep. 8, 2020

(54) SYSTEM AND METHOD FOR A COMPUTATIONAL NOTEBOOK INTERFACE

(71) Applicant: FUJI XEROX CO., LTD., Tokyo (JP)

(72) Inventors: John Edward Wenskovitch, Jr., Lower Burrell, PA (US); Jian Zhao, Cupertino, CA (US); Matthew L. Cooper, San Francisco, CA (US); Scott Carter, Menlo Park, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 60 days.

(21) Appl. No.: 16/172,357

(22) Filed: Oct. 26, 2018

(65) Prior Publication Data
US 2020/0133638 A1    Apr. 30, 2020

(51) Int. Cl.
*G06F 9/44*     (2018.01)
*G06F 8/33*     (2018.01)
*G06F 8/30*     (2018.01)
*G06F 3/0484*   (2013.01)
*G06F 16/901*   (2019.01)
*G06F 16/904*   (2019.01)

(52) U.S. Cl.
CPC .......... *G06F 8/33* (2013.01); *G06F 3/04847* (2013.01); *G06F 8/313* (2013.01); *G06F 16/904* (2019.01); *G06F 16/9024* (2019.01)

(58) Field of Classification Search
CPC ...... G06F 8/33; G06F 16/904; G06F 16/9024; G06F 8/313; G06F 3/04847
See application file for complete search history.

(56) References Cited

U.S. PATENT DOCUMENTS

| 9,460,191 | B1* | 10/2016 | Gaucher | G06F 16/29 |
|---|---|---|---|---|
| 2011/0040770 | A1* | 2/2011 | Madaan | G06F 16/95 |
| | | | | 707/754 |
| 2012/0143849 | A1* | 6/2012 | Wong | G06F 16/2393 |
| | | | | 707/722 |
| 2013/0151951 | A1* | 6/2013 | Hall | G06F 40/154 |
| | | | | 715/235 |
| 2013/0232475 | A1* | 9/2013 | Chamieh | G06F 8/41 |
| | | | | 717/140 |
| 2014/0013309 | A1* | 1/2014 | Gounares | G06F 11/3664 |
| | | | | 717/125 |
| 2015/0095923 | A1* | 4/2015 | Sarid | G06F 8/30 |
| | | | | 719/328 |

(Continued)

OTHER PUBLICATIONS

Kery, Mary Beth, and Brad A. Myers. "Interactions for Untangling Messy History in a Computational Notebook." 2018 IEEE Symposium on Visual Languages and Human-Centric Computing (VL/HCC). IEEE. (Year: 2018).*

(Continued)

*Primary Examiner* — Adam Lee
(74) *Attorney, Agent, or Firm* — Procopio, Cory, Hargreaves & Savitch LLP

(57) ABSTRACT

Example implementations described herein are directed to an improved interface for a computational notebook that represents cells of the computational notebook in a graph form involving nodes and links. Through such an improved interface, the execution order of the cells can be immediately understood, as well as the dependencies between different cells of executable code and the variables contained therein.

18 Claims, 17 Drawing Sheets

(56) References Cited

U.S. PATENT DOCUMENTS

| | | | |
|---|---|---|---|
| 2016/0205137 A1* | 7/2016 | Babb | H04L 63/20 726/1 |
| 2017/0109933 A1* | 4/2017 | Voorhees | G06F 17/2241 |
| 2017/0228445 A1* | 8/2017 | Chiu | G06F 16/25 |
| 2017/0255686 A1* | 9/2017 | Ross | G06F 3/0485 |
| 2018/0052891 A1* | 2/2018 | Shuster | G06F 8/20 |
| 2018/0067996 A1* | 3/2018 | Virshup | G06T 11/206 |

OTHER PUBLICATIONS

Kery, Mary Beth, et al. "Towards Effective Foraging by Data Scientists to Find Past Analysis Choices." (Year: 2019).*

Conlen, Matthew, and Jeffrey Heer. "Idyll: A Markup Language for Authoring and Publishing Interactive Articles on the Web." UIST. (Year: 2018).*

Hinsen, Konrad. "Verifiability in computer-aided research: the role of digital scientific notations at the human-computer interface." PeerJ Computer Science 4: e158. (Year: 2018).*

Kery et al. "Interactions for Untangling Messy History in a Computational Notebook". IEEE Symposium on Visual Languages and Human-Centric Computing (VL/HCC). October. (Year: 2018).*

Zentner et al. "Web notebooks as a knowledge management tool for system engineering trade studies". Annual IEEE International Systems Conference (SysCon) (pp. 1-5). (Year: 2017).*

Andrews, C., et al., Space to Think: Large, High-Resolution Displays for Sensemaking, in Proceedings of the SIGCHI Conference on Human Factors in Computing Systems CHI '10, Apr. 10-15, 2010, Atlanta, GA, pp. 55-64.

Zeppelin, Apache Zeppelin, 10 pgs. [online] [retrieved Aug. 6, 2018] URL: http://zeppelin.apache.org/.

Booch, G., et al., The Unified Modeling Language User Guide, Publisher: Addison Wesley, 1998, 391 pgs.

Bradel, L., et al, Multi-Model Semantic Interaction for Text Analytics, in 2014 IEEE Conference on Visual Analytics Science and Technology (VAST), Oct. 2014, pp. 163-172.

Brown, E.T., et al., Dis-Function: Learning Distance Functions Interactively, in 2012 IEEE Conference on Visual Analytics Science and Technology (VAST), Oct. 2012, pp. 83-92.

Carroll, J.D., et al., Analysis of Individual Differences in Multidimensional Scaling via an N-Way Generalization of "Eckart-Young" Decomposition, Psychometrika, 35(3), Sep. 1970, pp. 383-319.

Caserta, P. et al., Visualization of the Static Aspects of Software: A survey, IEEE Transactions on Visualization and Computer Graphics, 17(7), Jul. 2011, pp. 913-933.

Dash, S., et al., Portable Parallel Design of Weighted Multi-Dimensional Scaling for Real-Time Data Analysis, in 2017 IEEE 19th International Conference on High Performance Computing and Communications, Dec. 2017, Bangkok, Thailand, 8 pgs.

Databricks, Databricks—Making Big Data Simple, 3 pgs. [online] [retrieved Aug. 6, 2018] URL: https://databricks.com/.

Dowling, M., et al., SIRIUS: Dual, Symmetric, Interactive Dimension Reductions, to Appear in IEEE Transactions on Visualization and Computer Graphics, 2018, 11 pgs.

Endert, A., et al., Semantic Interaction for Sensemaking: Inferring Analytical Reasoning for Model Steering, IEEE Transactions on Visualization and Computer Graphics, 18(12), Dec. 2012, pp. 2879-2888.

Endert, A., et al., Semantic Interaction for Visual Text Analytics, in Proceedings of the SIGCHI Conference on Human Factors in Computing Systems, 2012, pp. 273-482.

Balmas, F., Displaying Dependence Graphs: A Hierarchical Approach, Journal of Software Maintenance and Evolution: Research and Practice, 16(3), 2004, pp. 151-185.

Guo, P.J., Software Tools to Facilitate Research Programming, Ph.D. Thesis, Stanford University, 2012, 230 pgs.

Guo, P.J., et al., BURRITO: Wrapping your Lab Notebook in Computational Infrastructure, USENIX Workshop on the Theory and Practice of Provenance, (TaPP '12), 2012, 4 pgs.

Heer, J., et al. Vizster: Visualizing Online Social Networks, in IEEE Symposium on Information Visualization INFOVIS, Oct. 2005, pp. 32-39.

Kandel, S., et al., Enterprise Data Analysis and Visualization: An Interview Study, IEEE Transactions and Visualization and Computer Graphics, 18, 2012, pp. 2917-2926.

Henley, A.Z., et al., CFar: A Tool to Increase Communication, Productivity, and Review Quality in Collaborative Code Review, in Proceedings of the 2018 CHI Conference on Human Factors in Computing Systems, CHI '18, New York, NY, 13 pgs.

Hoffswell, J., et al., Augmenting Code with in Situ Visualizations to Aid Program Understanding, in Proceedings of the 2018 CHI Conference on Human Factors in Computing Systems, CHI '18, New York, NY, 12 pgs.

Kery, M.B., et al., Variolite: Supporting Exploratory Programming by Data Scientists, in Proceedings of the 2017 CHI Conference on Human Factors in Computing Systems, CHI '17, 2017, New York, NY, pp. 1265-1276.

Kery, M.B.,. et al., The Story in the Notebook: Exploratory Data Science Using a Literate Programming Tool, in Proceedings of the 2018 CHI Conference on Human Factors in Computing Systems, CHI '18, 2018, New York, NY, 11 pgs.

Perez, F., et al., Project Jupyter: Computational Narrative as the Engine of Collaborative Data Science, 24 pgs., [online] [retrieved Jul. 17, 2018] URL: https://blog.jupyter.org/project-jupyter-computational-narratives-as-the-engine-of-collaborative-data-science-2b5fb94c3c58.

Pirolli, P., et al, The Sensemaking Process and Leverage Points for Analyst Technology as Identified Through Cognitive Task Analysis, Proceedings of International Conference on Intelligence Analysis, 2005, 6 pgs.

Project Jupyter, 2018, 7 pgs. [online] [retrieved Aug. 6, 2018] URL: http://jupyter.org/.

Robinson, A.C., Collaborative Synthesis of Visual Analytic Results, in 2008 IEEE Symposium on Visual Analytics Science and Technology, Oct. 2008, pp. 67-74.

Rule, A., et al., Exploration and Explanation in Computational Notebooks, in Proceedings of the 2018 CHI Conference on Human Factors in Computing Systems, CHI '18, New York, NY, 2018, 13 pgs.

Sagemath, 1 pg. [online] [retrieved Aug. 6, 2018] URL: http://www.sagemath.org/.

Seider, D., et al., Visualizing Modules and Dependencies of OSGi-based Applications, in 2016 IEEE Working Conference on Software Visualization (VISSOFT), Oct. 2016, pp. 96-100.

Srinivasa, S., et al, Foraging Among an Overabundance of Similar Variants, in Proceedings of the 2016 CHI Conference on Human Factors in Computing Systems, CHI '16, 2016, New York, NY, pp. 3509-3521.

Tabard, A., et al., From Individual to Collaborative: The Evolution of Prism, a Hybrid Laboratory Notebook, in Proceedings of the 2008 ACM Conference on Computer Supported Work, CSCW '08, 2008, New York, NY, pp. 569-578.

Van Der Maaten, L., et al., Visualizing Data Using t-SNE, Journal of Machine Learning Research, 9, 2008, pp. 2579-2605.

Wenskovitch, J., et al., Observation-Level Interaction with Clustering and Dimension Reduction Algorithms, in Proceedings of the 2nd Workshop on Human-In-the-Loop Data Analytics, HILDA '17, 2017, New York, NY, 6 pgs.

Wolfram Mathematica, Wolfram Mathematica: Modern Technical Computing 4 pgs. [online] [retrieved Aug. 6, 2018] URL: http://www.wolfram.com/mathematica/.

Xie, Y., knitr: A Comprehensive Tool for Reproducible Research in R, Implement Reprod Res, 2014, 24 pgs.

Yu, Z., et al., Characterizing the Usage and Impact of Java Annotations Over 1000+ Projects, 2018, 25 pgs. arXiv:1805.01965 [cs.SE].

* cited by examiner

FIG. 1

SYSTEM AND METHOD FOR A COMPUTATIONAL NOTEBOOK INTERFACE

BACKGROUND

Field

The present disclosure relates generally to computational notebooks, and more specifically, to systems and methods for a computational notebook interface.

Related Art

In the related art, computational notebooks have become a major medium for data exploration and insight communication in data science. These notebooks combine code, documentation, and output in a variety of forms (e.g., charts and tables) within a single document. Although expressive, dynamic, and flexible, such computational notebooks are in practice an interface that provides a loose collection of scripts, charts, and tables that rarely tell a story or clearly represent the analysis process.

Computational notebooks are programming environments that support interactive, iterative development of software. Related art implementations of computational notebooks share a common set of data-centric development features. Of particular note to the visualization that we present is the structural breakdown into blocks referred to as "cells."

In related art implementations, cells may appear in two forms. Markdown cells contain formatted text that is often used to provide context to the accompanying code, supplementing traditional code comments with discussion of the functionality, structure, and/or results of nearby code. In contrast, code cells are executable components, performing computations as any other executable file would, though limited by the bounds of the cell itself. After successfully executing, these code cells also contain formatted output in any number of formats: text, table, graph, image, video, and more.

SUMMARY

Though a shared notebook appears to be intended to run linearly through the cells, this structure is not enforced. A developer may create a notebook that is entirely code cells (or markdown cells) executed in an arbitrary order, potentially with some cells run multiple times, edited between executions, and with potentially multiple nonlinear execution paths within the notebook. Indeed, developers use these notebooks for a variety of purposes, including experimenting with alternate techniques, sharing results, temporary or "throwaway" code, and exploratory data analysis. Such a variety of approaches towards the use of computational notebooks naturally leads to challenges in sharing notebooks with other researchers, or tracing through errors in execution and debugging, as well as making it difficult to determine what code is being executed at a given time.

Further, computational notebooks include additional challenges and behaviors that are not supported by existing related art tools, such as the above-mentioned overall cellular structure and variable execution order. There is no interface that specifically addresses computational notebook problems.

Example implementations described herein are directed to an interface that summarizes the structure of notebooks to support more effective exploration and communication of ideas as well as provides functionality for execution of the computational notebook. Specifically, the interface illustrates the dependency and relationship between different units (e.g., text, code, etc.) of a notebook using a dynamic graph. Such an interface can be used for an analyst's self-reflection during exploratory programming and also as effective narratives for storytelling, collaboration, and communication between analysts.

Aspects of the present disclosure involve a method, which can include, for a first interface of a computational notebook comprising a plurality of cells, each of the plurality of cells comprising executable code, providing a second interface representing the computational notebook in a graph form comprising a plurality of nodes and a plurality of links linking the nodes, the nodes comprising representations of the plurality of cells. Further, the aspect can also include, for execution of a subset of the plurality of cells in the computation notebook, indicating a path through the nodes and links on the second interface indicative of an order of the execution of the plurality of cells.

Aspects of the present disclosure involve a non-transitory computer readable medium, storing instructions for executing a process which can include, for a first interface of a computational notebook comprising a plurality of cells, each of the plurality of cells comprising executable code, providing a second interface representing the computational notebook in a graph form comprising a plurality of nodes and a plurality of links linking the nodes, the nodes comprising representations of the plurality of cells. Further, the aspect can also include, for execution of a subset of the plurality of cells in the computation notebook, indicating a path through the nodes and links on the second interface indicative of an order of the execution of the plurality of cells.

Aspects of the present disclosure involve a system, which can include, for a first interface of a computational notebook comprising a plurality of cells, each of the plurality of cells comprising executable code, means for providing a second interface representing the computational notebook in a graph form comprising a plurality of nodes and a plurality of links linking the nodes, the nodes comprising representations of the plurality of cells. Further, the aspect can also include, for execution of a subset of the plurality of cells in the computation notebook, means for indicating a path through the nodes and links on the second interface indicative of an order of the execution of the plurality of cells.

Aspects of the present disclosure involve an apparatus, which can involve a processor, configured to, for a first interface of a computational notebook comprising a plurality of cells, each of the plurality of cells comprising executable code, provide a second interface representing the computational notebook in a graph form comprising a plurality of nodes and a plurality of links linking the nodes, the nodes comprising representations of the plurality of cells; for execution of a subset of the plurality of cells in the computation notebook, indicating a path through the nodes and links on the second interface indicative of an order of the execution of the plurality of cells.

BRIEF DESCRIPTION OF DRAWINGS

FIG. 1 illustrates an example interface of a computational notebook.

DETAILED DESCRIPTION

Figure 2:
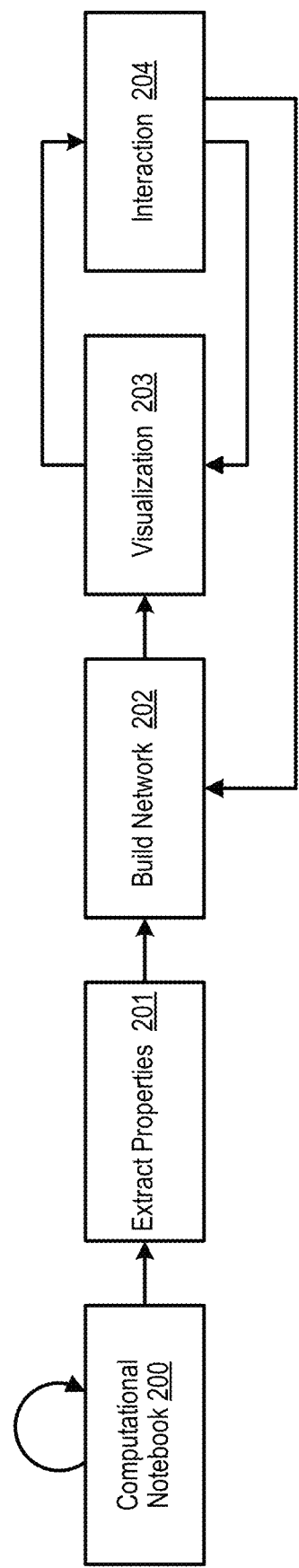
FIG. 2 illustrates an overall flow of the system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 1:
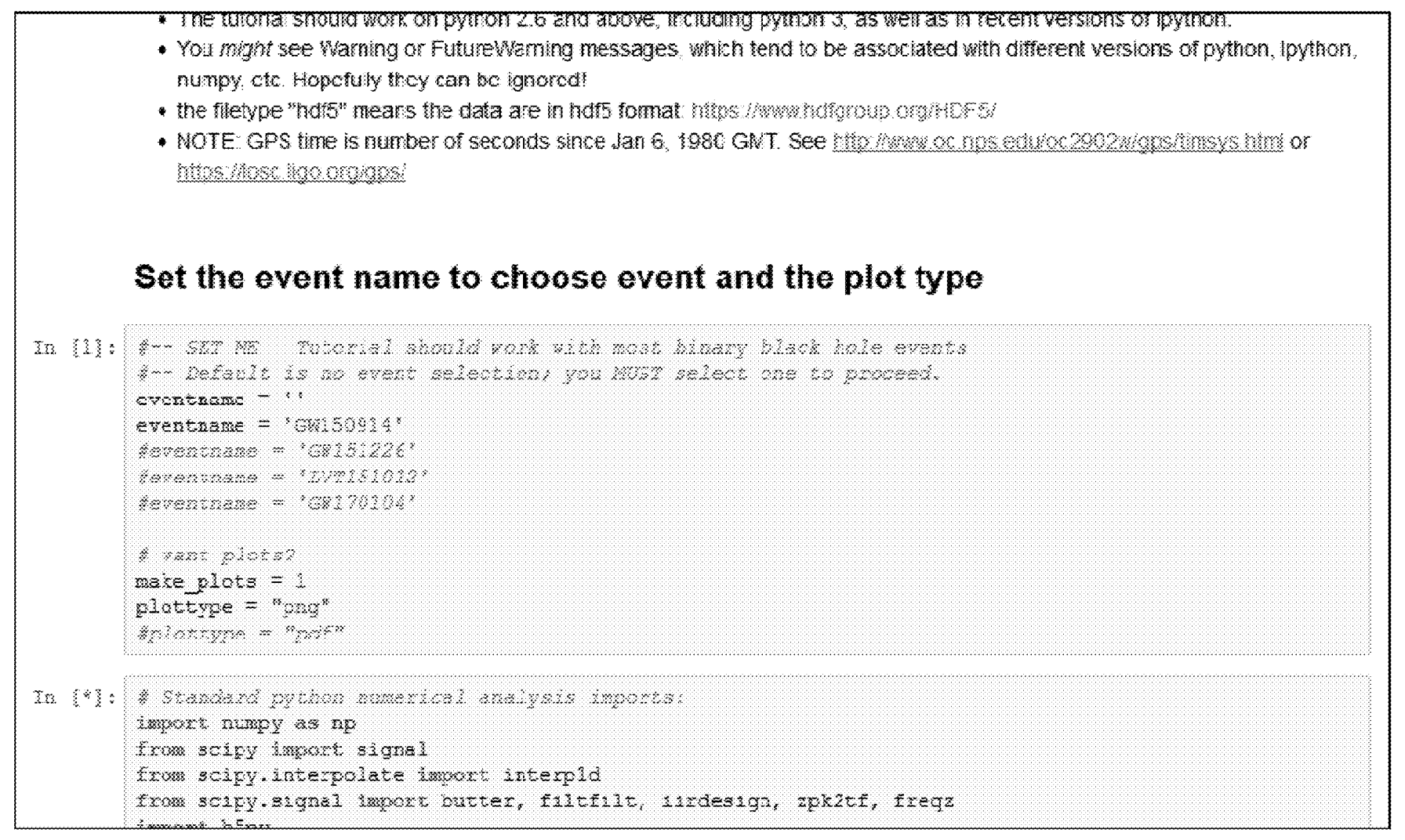

FIG. 1 illustrates an example interface of a computational notebook. Computational notebooks have become a major medium for data exploration and insight communication in data science. These notebooks combine code, documentation, and output in a variety of forms (e.g., charts and tables) within a single document. This new form of document is expressive, dynamic, and flexible, providing rich support for exploring and communicating ideas. For example, the content of a notebook could be broken down into cells (including markup language cells for text and code cells for scripts), and unlike related art integrated development environments (IDEs), such cells can be evaluated/executed in any order. These computational notebooks, although originally configured to be digital narratives, are in practice loose collections of scripts, charts, and tables that rarely tell a story or clearly represent the analysis process.

For related art computational notebooks there are several problems associated with the use of the interface. In the related art, analysts use computational notebooks in a variety of ways, including sharing results, quick experiments and throwaway code, prototyping code for inclusion in later pipelines, and data analysis. As many data science problems are complex, such use cases pose problems in collaborations in which problems are to be solved by multiple analysts working together. For example, one analyst may be unfamiliar with the conventions of another analyst, requiring additional assistance to understand the purpose and structure of a notebook that has been shared with them. There is a need for a tool, such as an improved interface, to assist this knowledge transferring and sharing process.

Both the popularity of computational notebooks, as well as the variety of ways that they are used by data scientists, present various problems. For example, Analysts may create multiple versions of similar but not identical code to test small changes in how data are collected, cleaned, and processed. In present interfaces, analysts can struggle to track of which version of the code produced what result, presenting a navigational challenge. Temporary experiments are treated as "throw-away" code that is poorly annotated or documented, yet such code may still end up in the final notebook, particularly if cells of code are executed in non-linear order. Analysts who are collaborating on a single notebook may struggle to make sense of the high-level structure of an existing notebook as present interfaces present such code in a linear form although it may be executed non-sequentially, potentially leading to slower development and/or the recreation of already-implemented analysis. As the use case of notebooks involve undirected, exploratory data analysis, the execution of code in a non-linear fashion conflicts with the linear structure of the present notebook interfaces.

Example implementations described herein involve an interface that can visually summarize the structure of a notebook, which can facilitate a visual overview of the structure of a computational notebook, including the relationships and dependencies between cells and variables. Example implementations can also provide an interface to facilitate a visual explanation of that structure, both to collaborators and for self-reflection, provide user-driven exploration of relationships between cells, visual debugging of runtime issues that arise when executing individual notebook cells, and facilitate an interface that reflects more effective narratives for storytelling, collaboration, and communication between analysts.

FIG. 2 illustrates an overall flow of the system, in accordance with an example implementation. Taking a computational notebook as input at 200, properties such as the individual markup language and code cells are extracted at 201, wherein a network is built by using the extracted properties separately as nodes within a force-directed graph at 202. Within the graph, the distance between nodes represents a measure of similarity (e.g., similar nodes are pulled close together, dissimilar nodes are widely separated) based on the variables used in each cell. Markup language cells also act as control points, often indicating sets of cells that comprise a higher level functional group (e.g., data loading, feature construction, etc.). The graph is then projected onto the screen for visualization 203, and a collection of controls allow an analyst to explore relationships and structures within the notebook at 204. Some interactions that cause substantial changes to the interface will require rebuilding the network in addition to updating the visualization. Additionally, user alterations to the notebook require the construction of an updated visualization to represent those modifications.

Consider the following use case: an analyst has been working alone to develop a computational notebook for data analysis, has developed a substantial amount of code but is now reaching the limits of their data science expertise, and needs to bring in a second analyst who is more experienced in the use of a certain algorithm or library. This second analyst needs to quickly get up to speed on the current state of the notebook in order to contribute. However, this could require examining hundreds or thousands of lines of source code to understand structures such as key variables that are used, the current methods for data processing, and/or the relationship between major functional components of the data pipeline.

Rather than tracing through the code itself, the second analyst can use the interface to quickly understand the high-level structure of the notebook, manipulate the interface to see relationships between individual cells and larger code structures, locate code cells that are relevant to their contribution in continuing to develop the notebook, trace the use of common variables and functions within the notebook, and understand the development history of the notebook.

Figure 3:
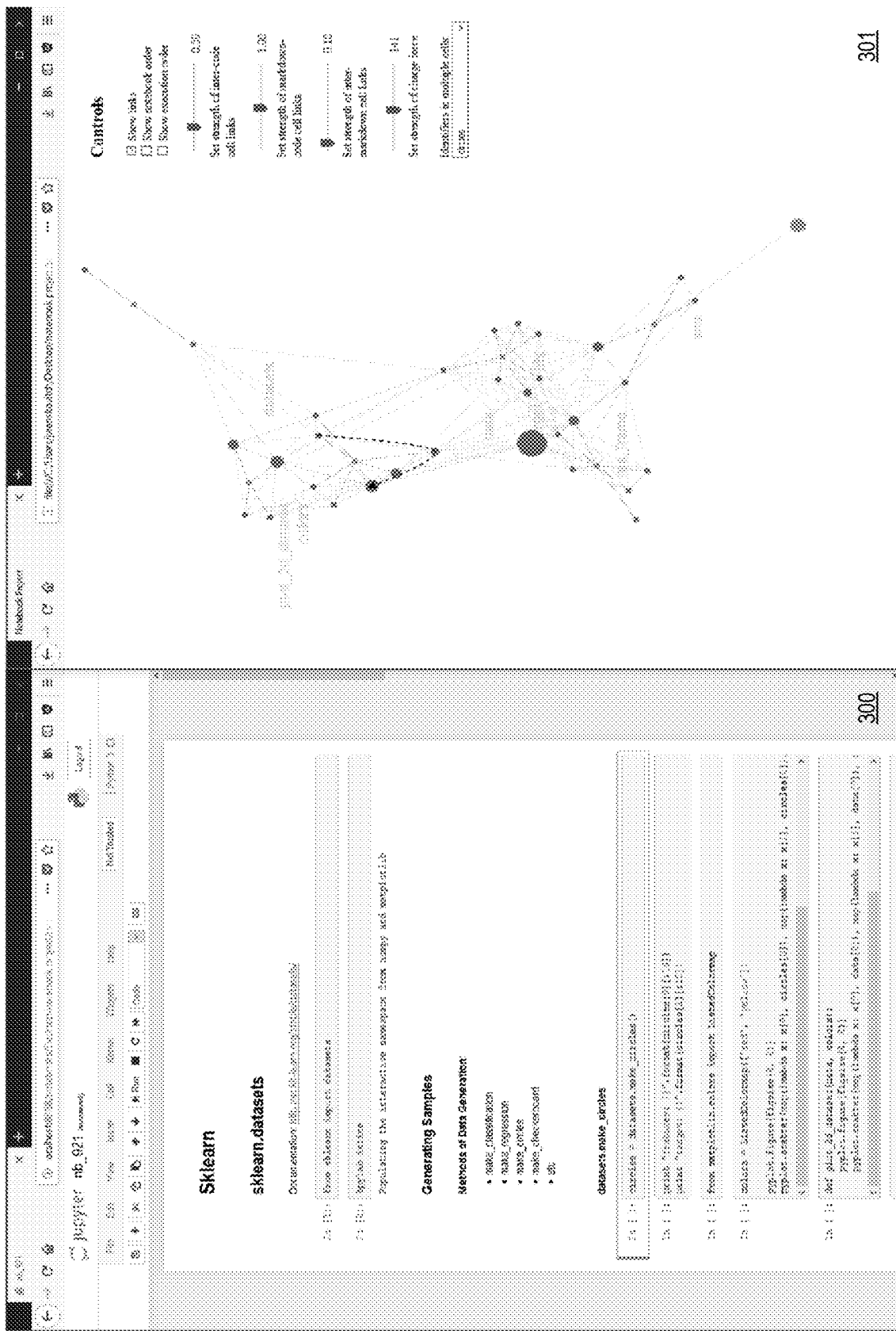
FIG. 3 illustrates an example of the computation notebook interface in accordance with an example implementation.

FIG. 3 illustrates an example of the computation notebook interface in accordance with an example implementation. In this example, an analyst is simultaneously running a computational notebook 300 while visually exploring the runtime execution on the proposed system interface 301.

Figure 4:
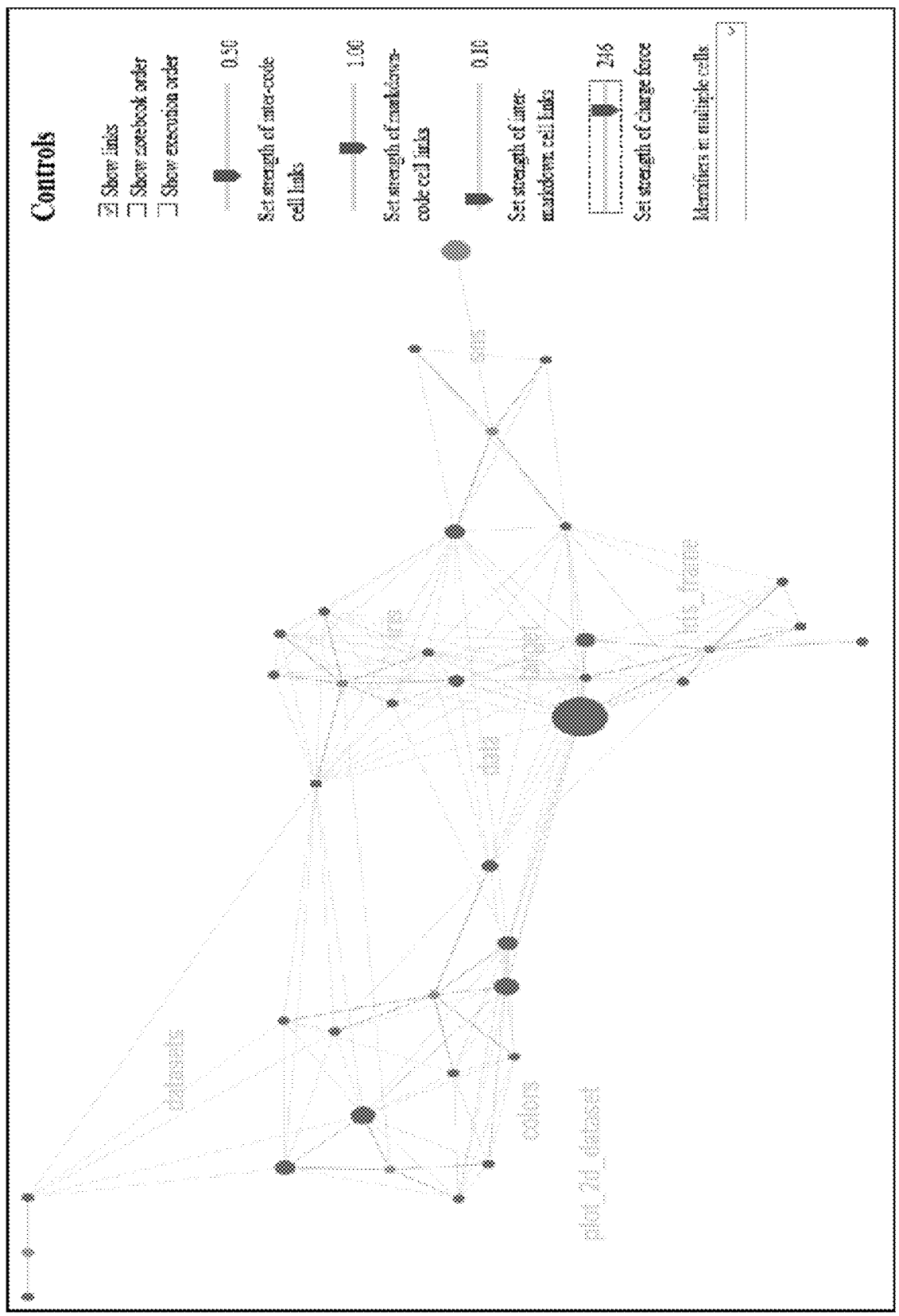
FIGS. 4 to 7 illustrate aspects of an example system interface, in accordance with an example implementation.

FIG. 4 illustrates an example system interface, in accordance with an example implementation. This interface can involve two regions: a large graph exploration space to the left and a panel of controls to the right. The graph exploration space contains the network graph representing the computational notebook, rendered with nodes (e.g., colored, greyscale, etc.) and semi-transparent links. For example, one node color can represent markup language cells while another node color can represent code cells.

The width and opacity of the links can be mapped to the measured similarity of the node pairs that they connect, except for the case of the links that connect markup cells to code cells, which can be structural connectors in accordance with the desired implementation. The length of the link is also mapped to this measured similarity, but the physics of the force-directed simulation can make the rendered length imprecise, justifying the dual encoding. The similarity measure can be computed based on the number of variables and functions shared by the connected nodes, with the pair of cells sharing the most variables and functions mapped to the strongest link strength in the graph. However, other alternative approaches towards computing and rendering these similarities could include, but are not limited to, user-specified strengths, identifying variables and functions that are unique to certain cell pairs (e.g., via term frequency-inverse document frequency), taking into account the distance between cells in the linear notebook structure, and using a deep learning approach to identify underlying cell commonalities.

The background of the exploration space can be tagged with common variables and functions used in the notebook. Such variables and functions can also be positioned by force-directed means but without visible links connecting the tags to the rest of the graph depending on the desired implementation. Such implementations provide contextual information to the analyst, allowing them to quickly see which portion of the graph corresponds to what functionality of the code.

With this visualization, the second analyst can quickly get an understanding of some of the structures within the notebook. For example, the tagged background shows where common variables are located within the graph. If this analyst is going to contribute expertise on data clustering, they could locate tags for variables such as clusterGroup, or perhaps look for variable describing a well-known dataset such as iris in the center of FIG. 4.

After identifying the relevant area of the visualization, this analyst can then begin to explore the code and markup cells relevant to that area. Each class of link (code-code, code-markup, markup-markup) has an associated weight, allowing the analyst to update the graph layout to enhance certain structures.

Figure 5:
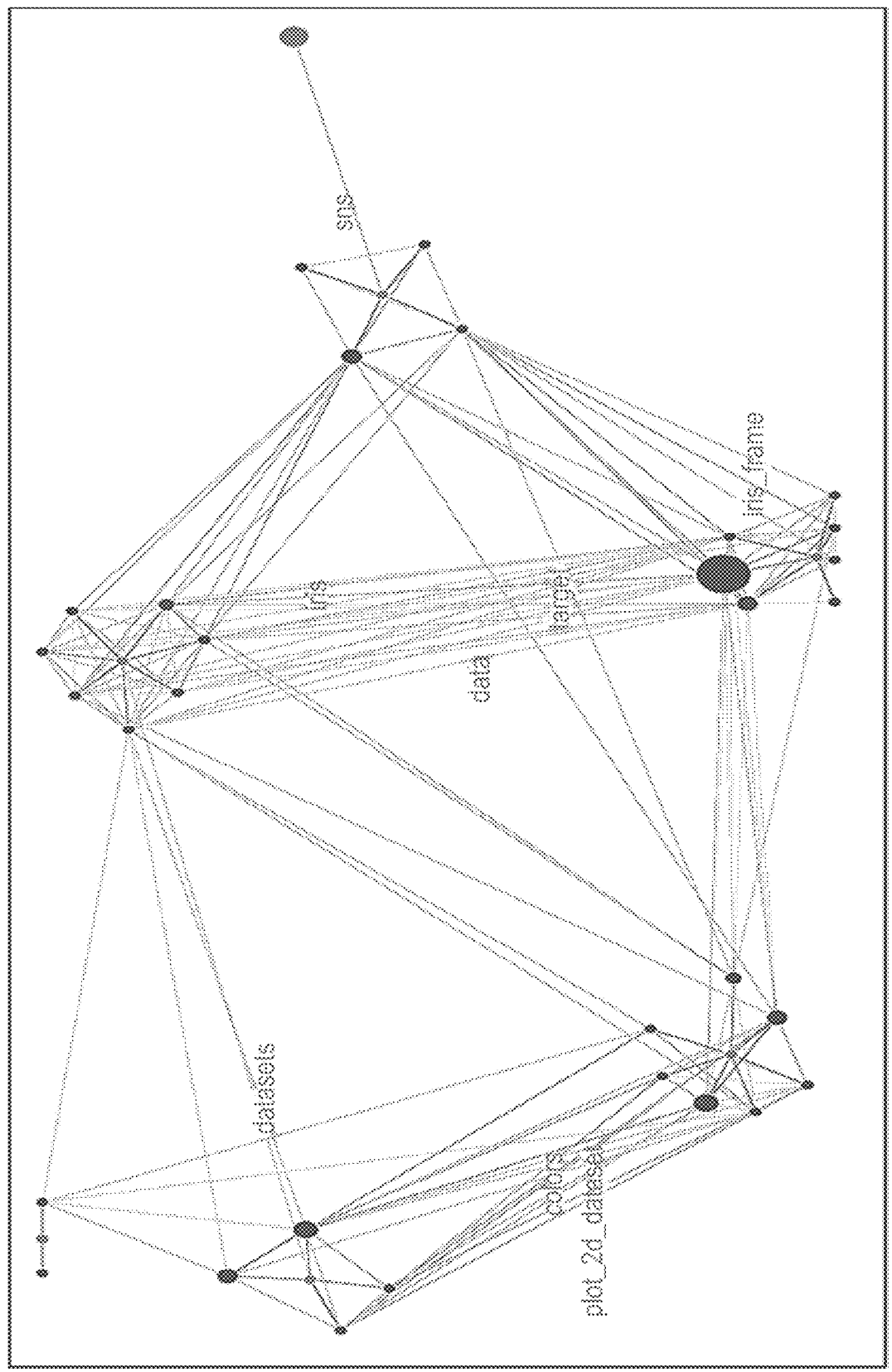

FIG. 5 illustrates another example interface, in accordance with an example implementation. In FIG. 5, the analyst has increased the weight applied to the code-markup links and decreased the weight applied to the code-code links. As a result, the higher level functional groups of cells within the notebook become more visible in the structure of the graph, while the relationship between individual cells in the notebook is lost. With this view, an analyst can quickly identify these high-level functional structures within a notebook. Increasing the strength of the markup-markup links will pull similar structures closer together, indicating functional relationships between these structural groups.

Figure 6:
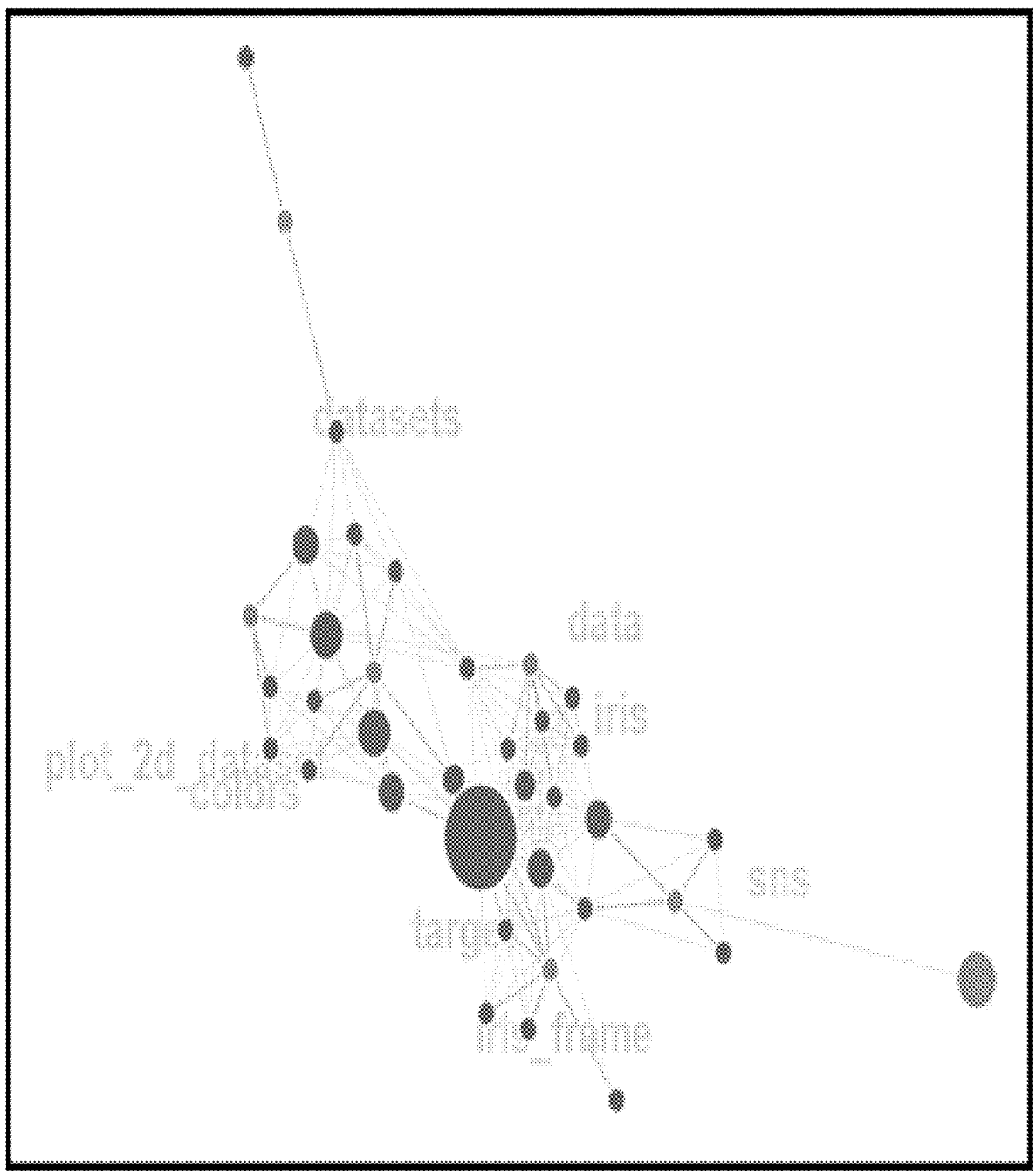

FIG. 6 illustrates another example interface, in accordance with an example implementation. Specifically, FIG. 6 show the opposite effect of FIG. 5, with the functional groups now treated as less important than the global relationships between code cells. Now, the analyst can determine if a cell is positioned in the wrong group linearly within the notebook, as these cells will be pulled away from the corresponding markdown node and towards the code cells of another group.

Figure 7:
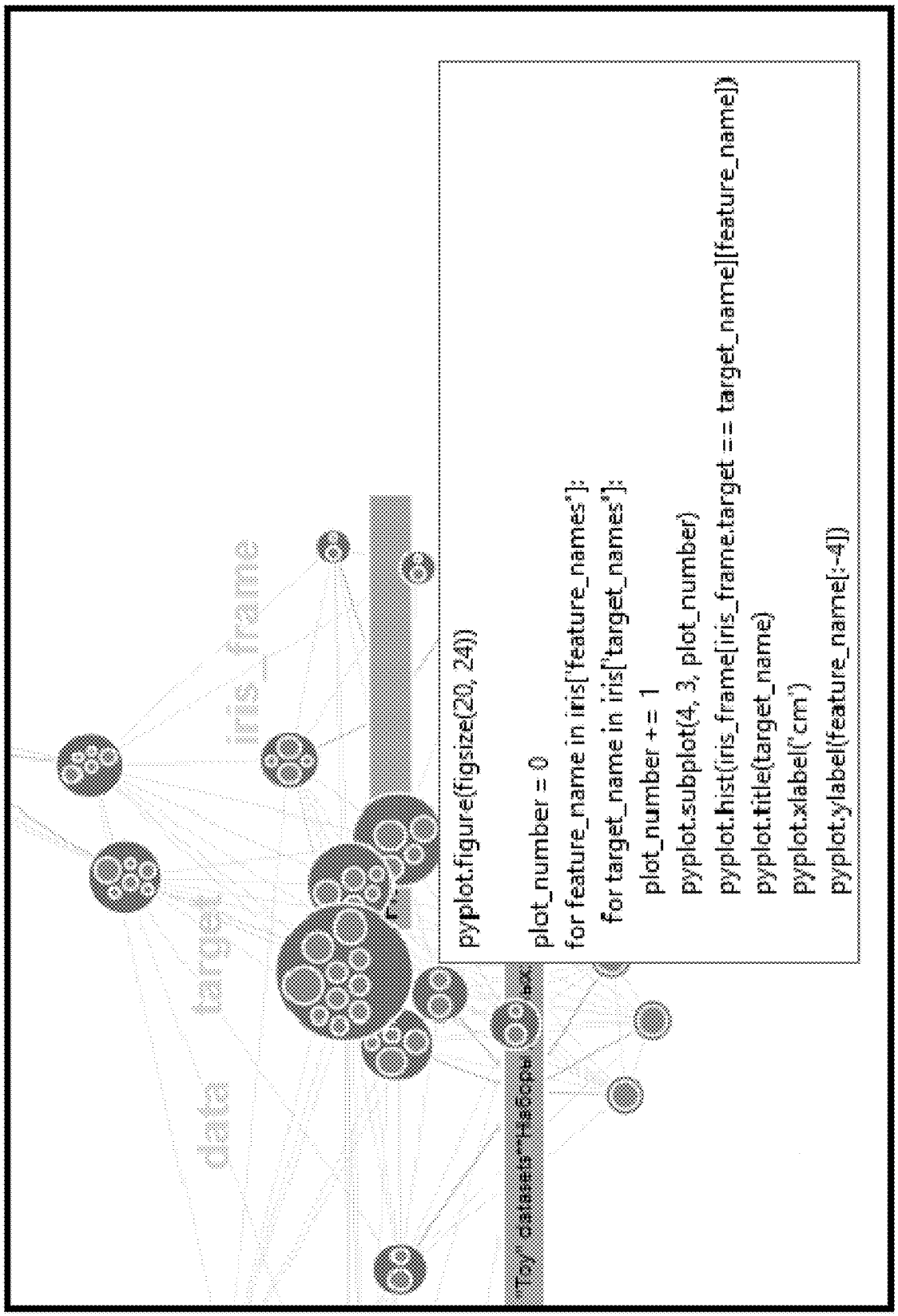
Figure 8A:
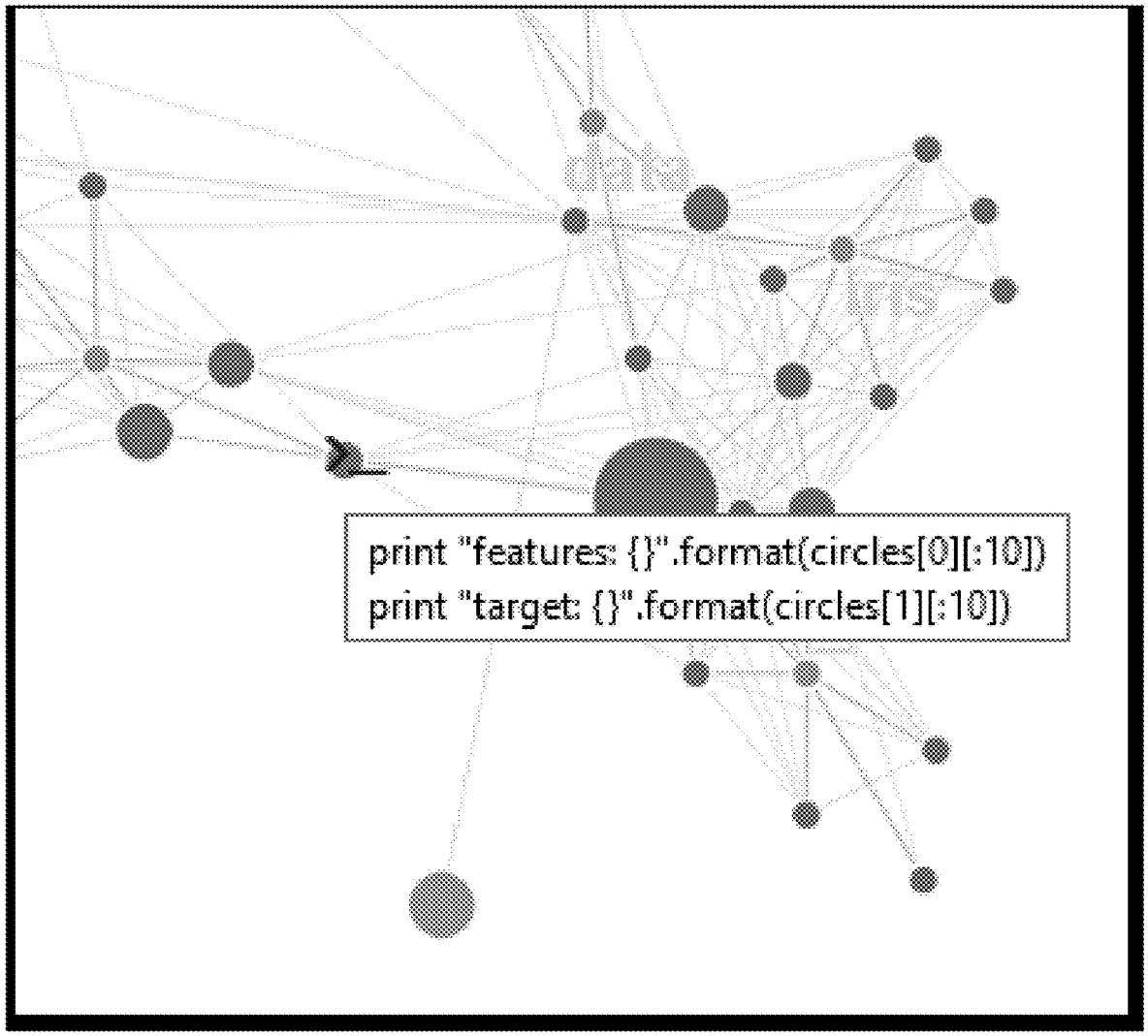
FIGS. 8(a) to 8(d) illustrate an example for highlighting nodes in the interface, in accordance with an example implementation.
Figure 8B:
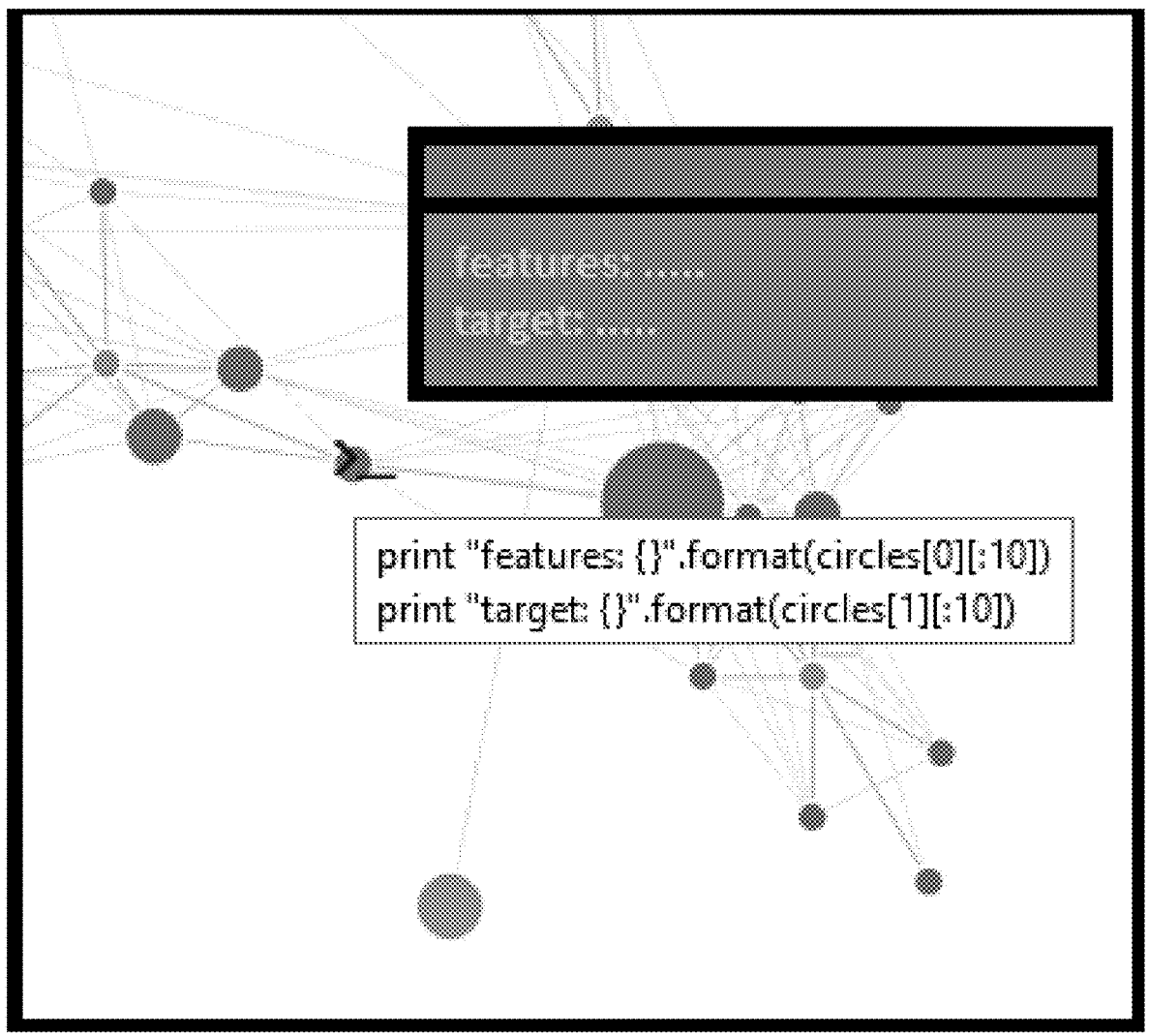
Figure 8C:
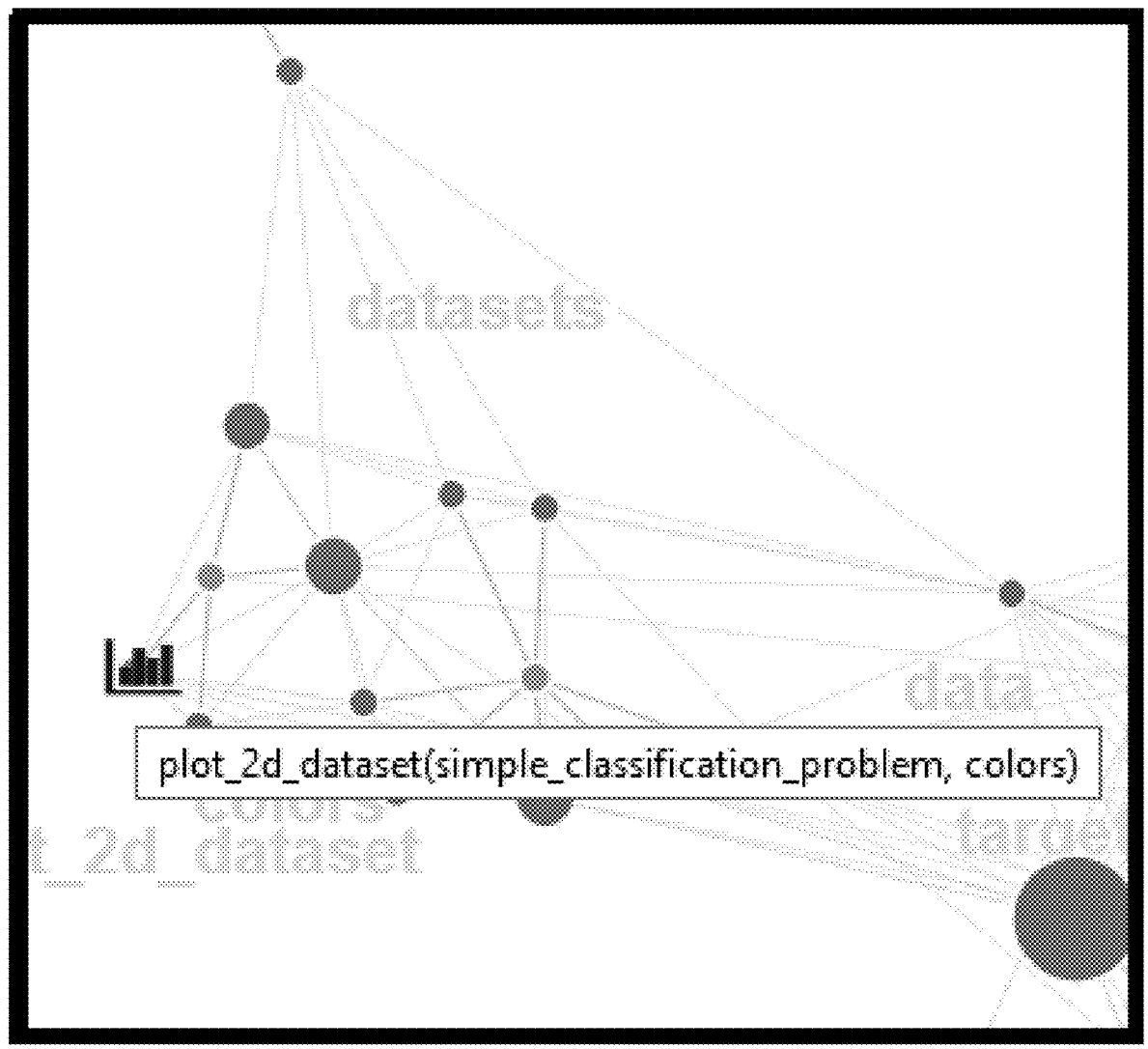
Figure 8D:
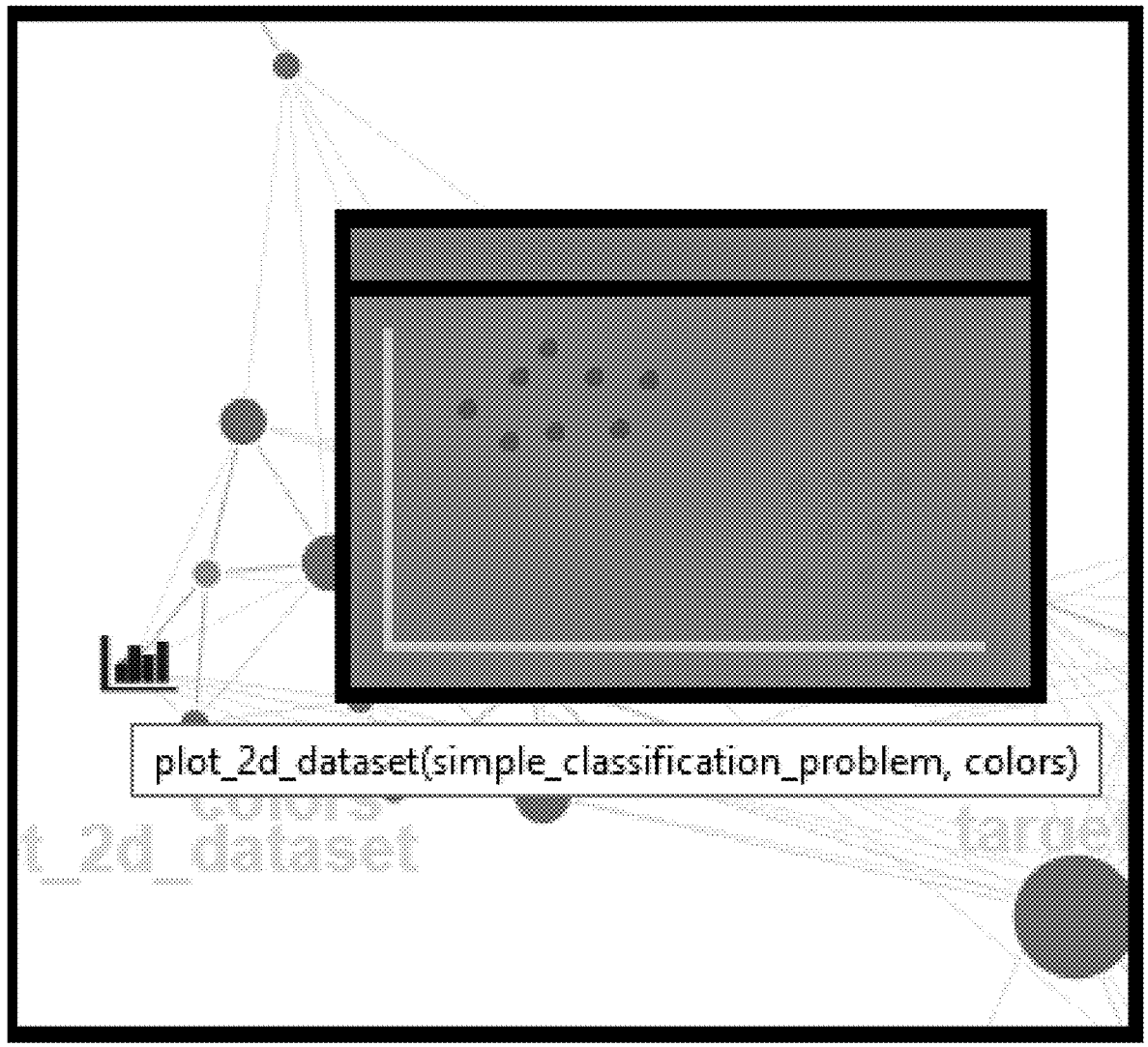

FIG. 7 illustrates another example interface, in accordance with an example implementation. To further explore the graph, analysts can highlight nodes (e.g., hover the mouse cursor over nodes) to reveal the source code in the accompanying cells, which the analyst can then modify and cause a re-execution of the computational notebook.

FIGS. 8(a) to 8(d) illustrate an example for highlighting nodes in the interface, in accordance with an example implementation. In an example implementation, hovering over a markup node displays the markup language that was included in that cell (FIG. 8(a)). In another example implementation, hovering over a code node displays both the source code and a badge (FIG. 8(b)). The badge corresponds to the type of output produced by a cell, such as graph, table, file, text, and no output. Such badges can be replaced with the graphical output of those code cells, resulting in rendering the chart (FIG. 8(d)) rather than simply indicating that the output is a chart (FIG. 8(c)) in accordance with the desired implementation.

Figure 9:
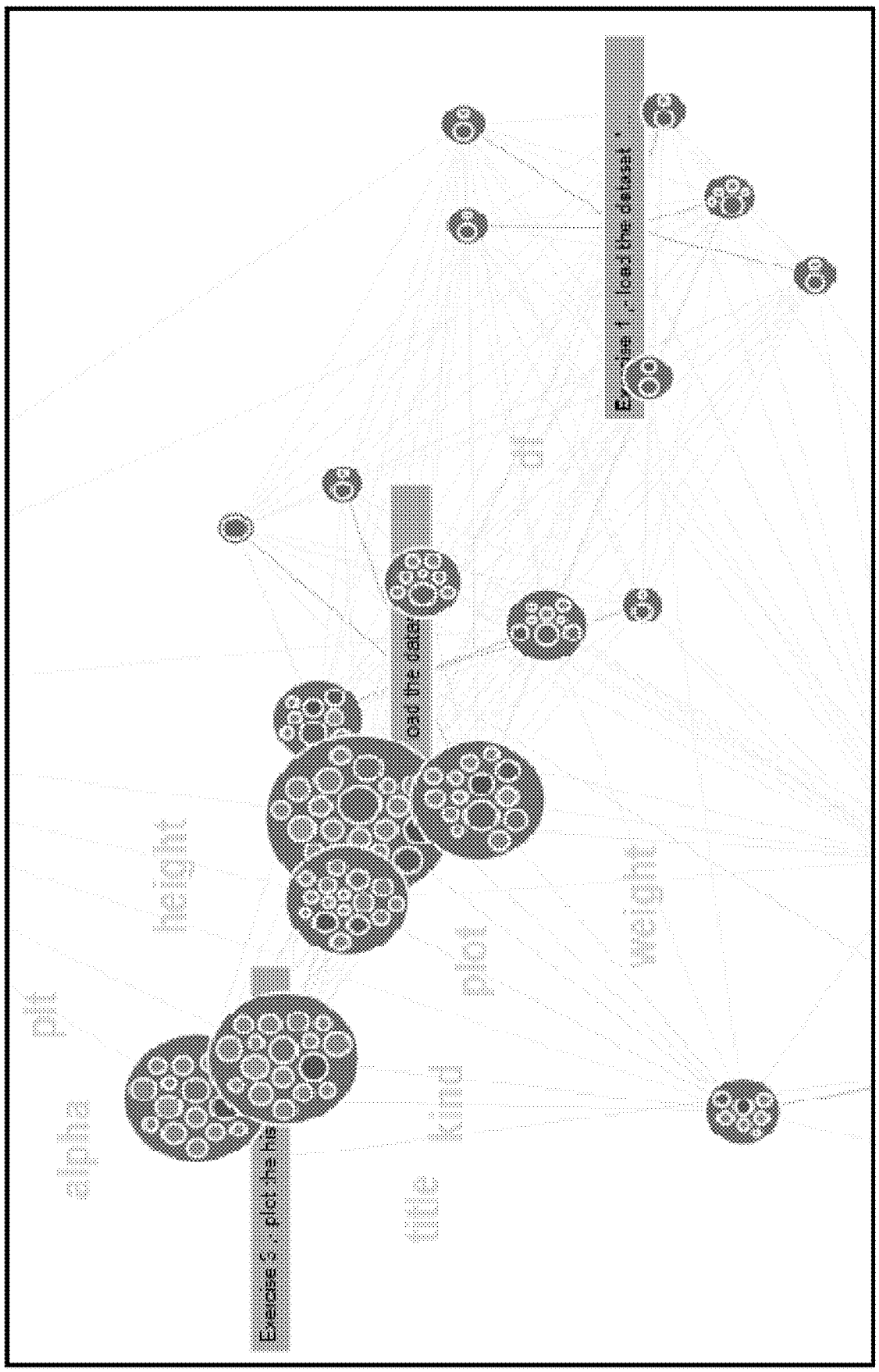
FIG. 9 illustrates an example of code cell glyphs, in accordance with an example implementation.

FIG. 9 illustrates an example of code cell glyphs, in accordance with an example implementation. In example implementations, the code cell glyphs can be enhanced by using a circle-packing technique to display properties of these cells, such as the variables. Further still, some of the properties of these variables can be visualized, as seen in FIG. 9 where the size of the variable nodes encodes their frequency in the notebook and the five most frequently-used variables receive unique colors.

Figure 10:
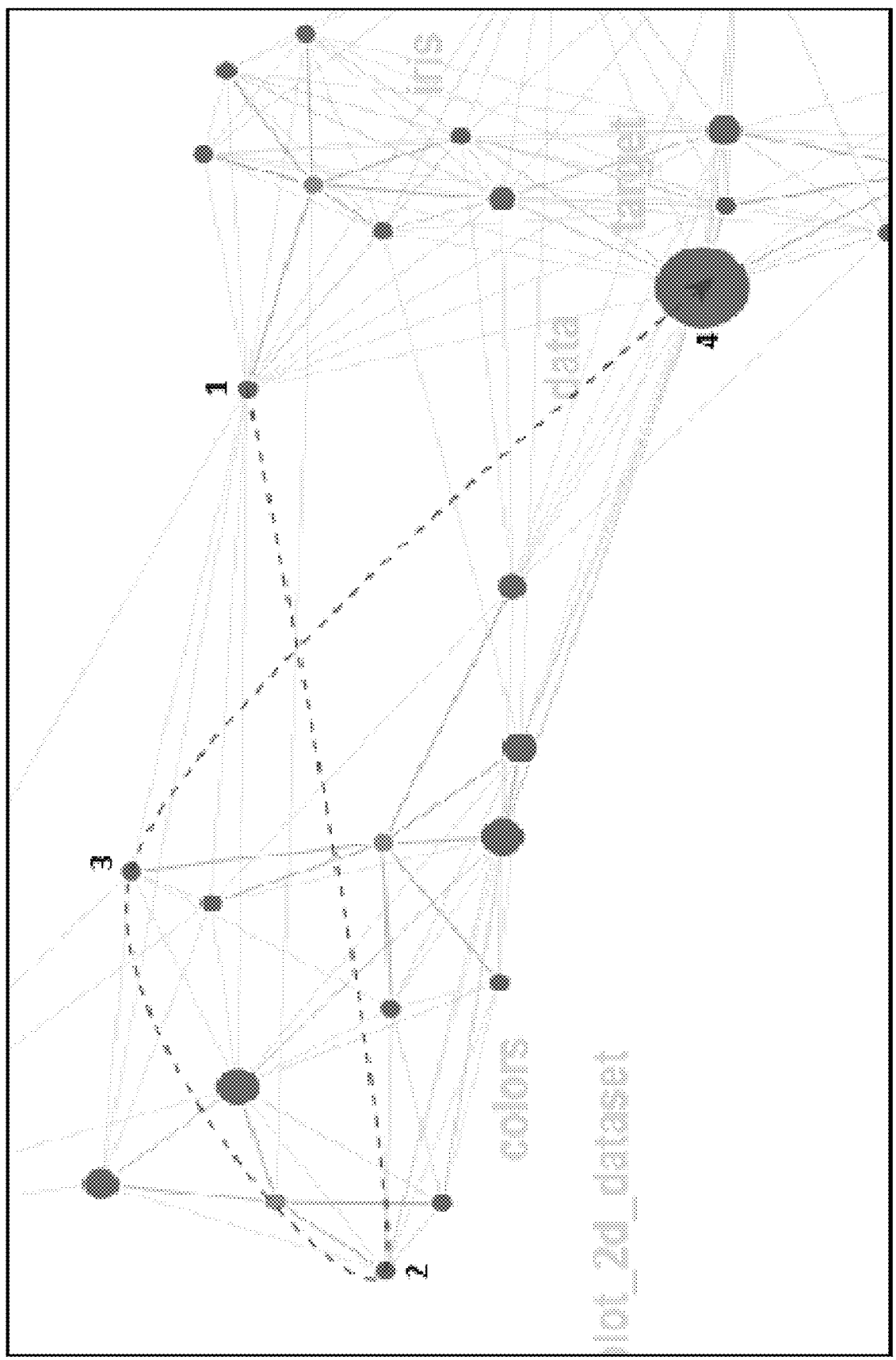
FIG. 10 illustrates a path through the executed nodes, in accordance with an example implementation.
Figure 11:
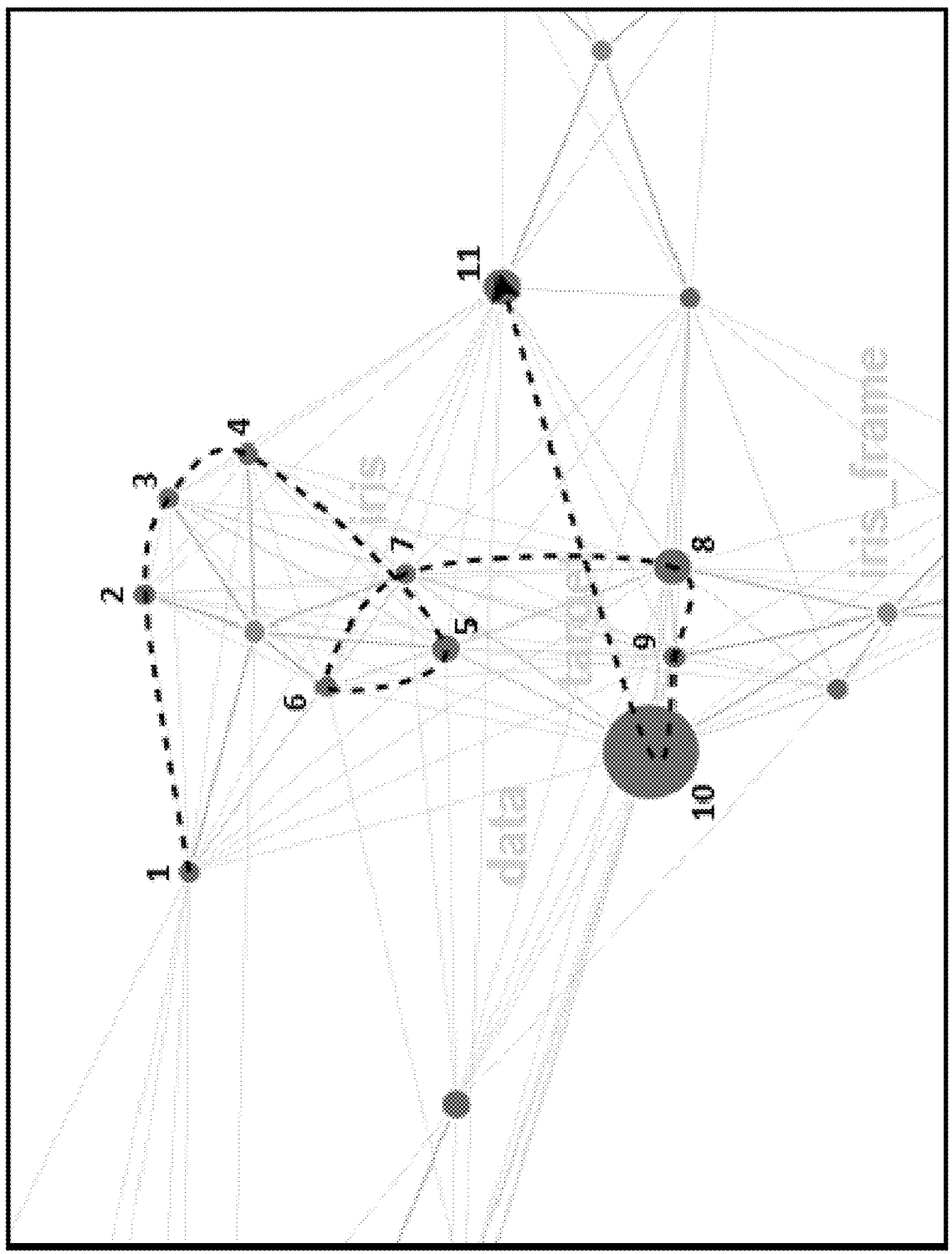
FIG. 11 illustrates a path connecting all cells that use a selected variable or function, in accordance with an example implementation.

The exploration space can be further annotated with additional features, such as drawing a path through the nodes (corresponding to the linear order of the notebook), a path through the executed nodes as illustrated in FIG. 10 (e.g., showing what the analyst has recently done with the system), or a path connecting all cells that use a selected variable or function as illustrated in FIG. 11 (e.g., showing an additional relationship between the cells). In an example implementation, the analyst may want to manipulate the iris dataset, and hence is interested in seeing where the initial analyst has already used that dataset. By highlighting a path for that variable through the notebook, the current usage of that variable can be quickly identified Displaying such paths also permits an analyst to visually debug some issues with their code. For example, variables such as x and i are frequently used as counters. If an analyst forgets to reset that counter, unexpected behavior can result. This unexpected behavior is compounded in computational notebooks because the analyst can choose to execute cells out of order. Using the variable path provides the analyst with a quick summary of the code cells that should be inspected for a missing counter reset. Accompanying that path with the execution order path narrows the search space further by eliminating code cells that have not been executed yet.

Figure 12:
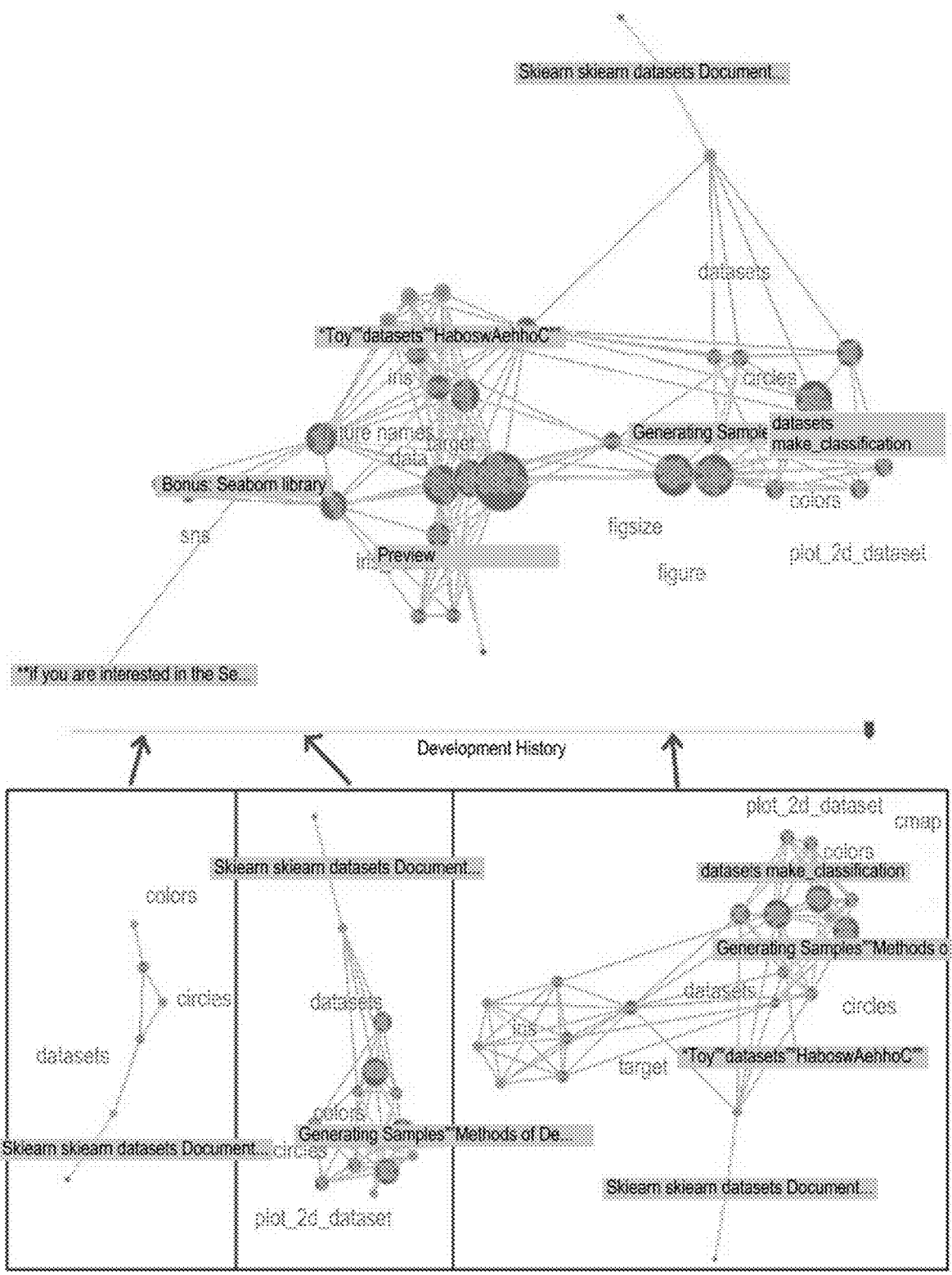
FIG. 12 illustrates an example implementation involving a time slider.

FIG. 12 illustrates an example implementation involving a time slider. A programmer can also use the system to examine the development history of a notebook with the inclusion of a time slider. Given such a feature, the programmer can better understand the thoughts of the original developer as they were constructing the notebook, adding and removing markdown and code cells, modifying variables, and testing important outputs.

Figure 13:
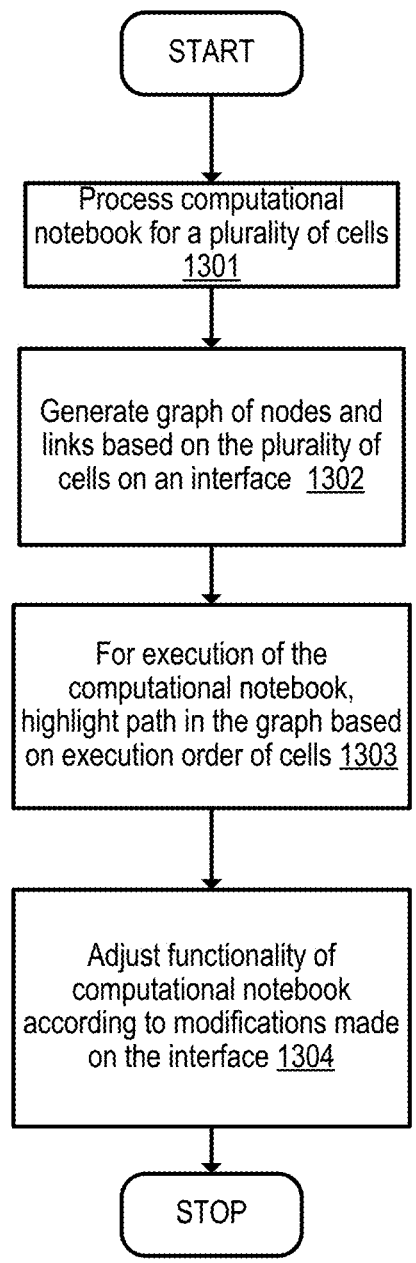
FIG. 13 illustrates an example flow diagram according to an example implementation.

FIG. 13 illustrates an example flow diagram according to an example implementation. Specifically, FIG. 13 illustrates an example flow diagram for generating an interface to be used with an interface of a computational notebook. At 1301, a computational notebook is processed for the cells contained therein. At 1302, a graph of nodes and links are generated on an interface based on the plurality of cells. At 1303, when the computational notebook is executed, the path along the nodes and links are highlighted based on the execution order of the cells. At 1304, should modifications be made on the interface, the functionality of the computational notebook and its execution can be adjusted based on the modifications made therein.

Figure 14:
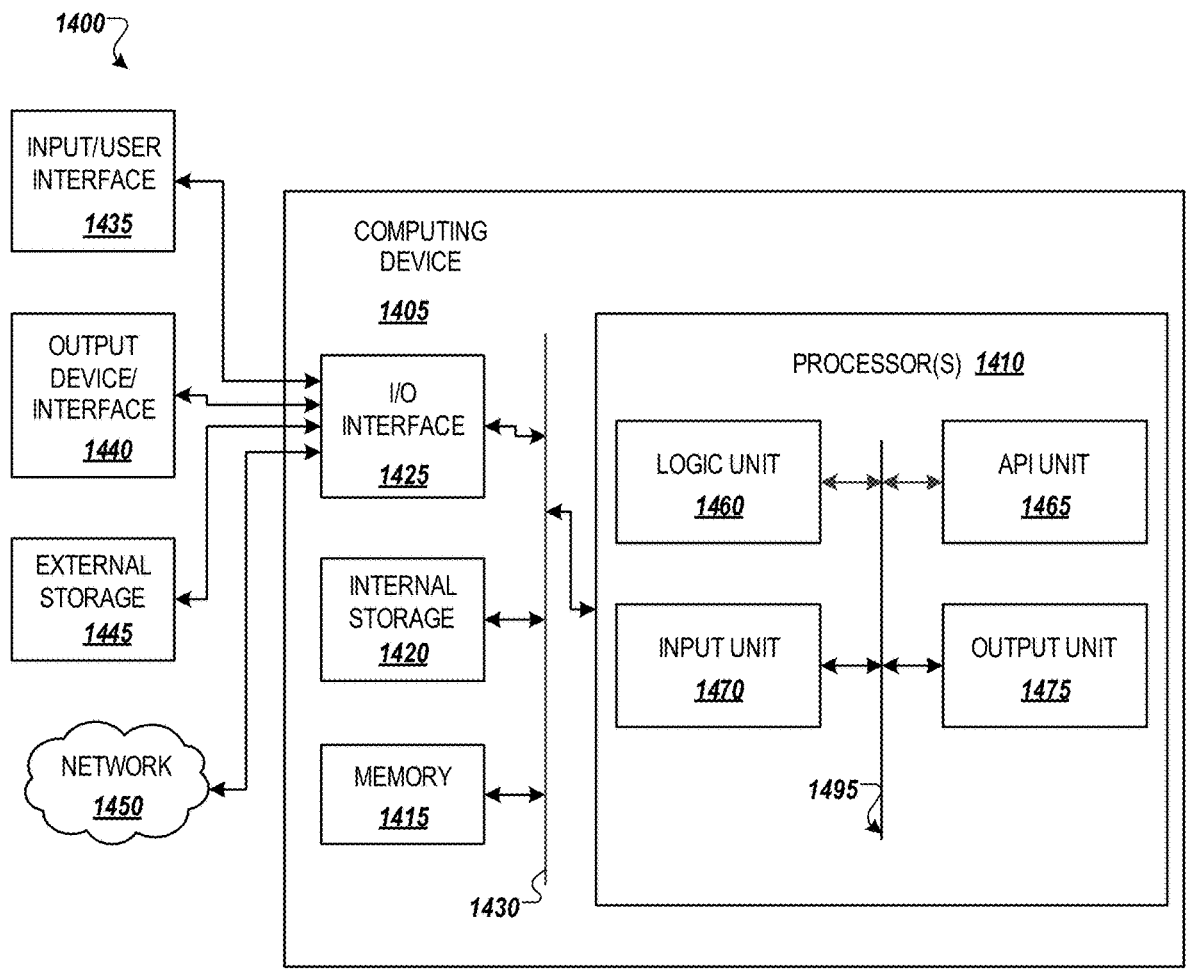
FIG. 14 illustrates an example computing environment with an example computer device suitable for use in example implementations.

FIG. 14 illustrates an example computing environment with an example computer device suitable for use in example implementations. Computer device 1405 in computing environment 1400 can include one or more processing units, cores, or processors 1410, memory 1415 (e.g., RAM, ROM, and/or the like), internal storage 1420 (e.g., magnetic, optical, solid state storage, and/or organic), and/or I/O interface 1425, any of which can be coupled on a communication mechanism or bus 1430 for communicating information or embedded in the computer device 1405.

Computer device 1405 can be communicatively coupled to input/user interface 1435 and output device/interface 1440. Either one or both of input/user interface 1435 and output device/interface 1440 can be a wired or wireless interface and can be detachable. Input/user interface 1435 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1440 may include a display, television, monitor, printer, speaker, braille, or the like. In some example implementations, input/user interface 1435 and output device/interface 1440 can be embedded with or physically coupled to the computer device 1405. In other example implementations, other computer devices may function as or provide the functions of input/user interface 1435 and output device/interface 1440 for a computer device 1405. In example implementations involving a touch screen display, a television display, or any other form of display, the display is configured to provide a user interface as illustrated, for example, at FIGS. 1 to 12.

Examples of computer device 1405 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1405 can be communicatively coupled (e.g., via I/O interface 1425) to external storage 1445 and network 1450 for communicating with any number of networked components, devices, and systems, including one or more computer devices of the same or different configuration. Computer device 1405 or any connected computer device can be functioning as, providing services of, or referred to as a server, client, thin server, general machine, special-purpose machine, or another label.

I/O interface 1425 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1400. Network 1450 can be any network or combination of networks (e.g., the Internet, local area network, wide area network, a telephonic network, a cellular network, satellite network, and the like).

Computer device 1405 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1405 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Memory 1415 may be configured to store or manage algorithms to be executed by processor(s) 1410 as described in the flow, for example, at FIG. 2 and FIG. 13. The example implementations as described herein may be conducted singularly, or in any combination of each other according to the desired implementation and are not limited to a particular example implementation.

Processor(s) 1410 can execute under any operating system (OS) (not shown), in a native or virtual environment. One or more applications can be deployed that include logic unit 1460, application programming interface (API) unit 1465, input unit 1470, output unit 1475, and inter-unit communication mechanism 1495 for the different units to communicate with each other, with the OS, and with other applications (not shown). The described units and elements can be varied in design, function, configuration, or implementation and are not limited to the descriptions provided. Processor(s) 1410 can be in the form of physical processors or central processing units (CPU) that is configured to execute instructions loaded from Memory 1415.

In some example implementations, when information or an execution instruction is received by API unit 1465, it may be communicated to one or more other units (e.g., logic unit 1460, input unit 1470, output unit 1475). In some instances, logic unit 1460 may be configured to control the information flow among the units and direct the services provided by API unit 1465, input unit 1470, output unit 1475, in some example implementations described above. For example, the flow of one or more processes or implementations may be controlled by logic unit 1460 alone or in conjunction with API unit 1465. The input unit 1470 may be configured to obtain input for the calculations described in the example implementations, and the output unit 1475 may be configured to provide output based on the calculations described in example implementations.

In example implementations, processor(s) 1410 can be configured to, for a first interface of a computational notebook involving a plurality of cells, each of the plurality of cells comprising executable code as shown in FIG. 1 and interface 300 of FIG. 3, provide a second interface representing the computational notebook in a graph form involving a plurality of nodes and a plurality of links linking the nodes, the nodes involving representations of the plurality of cells as illustrated in interface 301 of FIG. 3; and for execution of a subset of the plurality of cells in the computation notebook, indicating a path through the nodes and links on the second interface indicative of an order of the execution of the plurality of cells as illustrated, for example in FIGS. 10 and 11. Through the first and second interfaces, users can determine quickly which cells are being executed and add cells or modify the cell execution order through the second interface without having to trace through the linear first interface of the cells, and can selectively enable, disable, or re-arrange the order of execution of cells without having to physically locate the cells within the computational notebook. Further, users may forget to run cells which may cause nonsensical results or errors, which can be immediately understood through the second interface. Through the second interface of nodes, the user can immediately link the correct cells or change the execution order or add cells without having to sift through many cells of code that are arranged in linear order but not necessarily execution order in the first interface. Users can also click on components of the second interface to navigate to their corresponding part in the first interface, and vice versa. Such implementations can be crucial for computational notebooks that are edited by many users, as the changes between versions created by such users are not readily discernable through the interface of the computational notebook.

Processor(s) 1410 are further configured to, upon a highlighting of one of the plurality of nodes, extract code from one of the plurality of cells corresponding to the one of the plurality of nodes; present the extracted code corresponding to the one of the plurality of nodes for display; and for modifications made to the displayed extracted code, modify the one of the plurality of cells in the first interface according to the modifications as illustrated in FIGS. 6-8(*d*). Through the second interface, the corresponding execution code of a cell can be immediately presented to the user for modification, which is not normally possible through the interface of a computational notebook. The user can then modify the code or the output to be provided by the cell, and then have the computational notebook re-executed.

Processor(s) 1410 can be configured to provide, on corresponding nodes of the second interface, an indication of variables utilized in each cell of the plurality of cells as illustrated in FIG. 9. Through such an example implementation, users can immediately determine which variables are utilized in which cells without needing to trace through the interface of the computational notebook. Further, the user can identify the values of such variables within each computational cell, as well as the dependency of the variables between cells which is not readily discernable from the computational notebook. Such example implementations allow quick identification of errors in variables or misused variables in particular cells.

Processor(s) 1410 can be configured to, upon a highlighting of one of the plurality of nodes, determine a representation of a chart associated with one of the plurality of cells corresponding to the one of the plurality of nodes; and present the determined chart corresponding to the one of the plurality of nodes for display as illustrated in FIGS. 8(*c*) and 8(*d*). Through such an example implementation, the user can immediately find the data output of a particular cell and configure the output to be in chart form or otherwise in accordance with the desired implementation, which is an improvement to the interface of the computational notebook, in which the user would have to physically locate the cell within the computational notebook to obtain such outputs.

Depending on the desired implementation, the graph can be a force-directed graph, wherein the plurality of nodes are arranged according to similarity of variables used in corresponding cells such that a length of each of the plurality of links is representative of the similarity as illustrated, for example, in FIGS. 4 to 6.

Processor(s) 1410 can also be configured to provide on the second interface, a time slider configured to provide one or more historical execution snapshots of the computational notebook; and for an interaction on the time slider to a specific time period, display the graph form of the computational notebook according to a corresponding one of the one or more historical execution snapshots as illustrated in FIG. 12. Such implementations can be crucial for computational notebooks that are edited by many users, as the changes between versions created by such users are not readily discernable through the interface of the computational notebook, and a user may wish to return the computational notebook to a previous version. Through such an implementation, snapshots of the computational notebook are periodically taken and represented in the graph form as illustrated in FIG. 12, and users can readily switch back to the desired version, which is functionality that is not available through the interface of the computational notebook.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   receiving a computational notebook comprising a plurality of cells, each of the plurality of cells comprising executable code and markdown;
   building a first interface of the computational notebook, the first interface comprising the plurality of cells;
   extracting properties from the executable code and markdown of each of the plurality of cells;
   building a second interface using the extracted properties, the second interface representing the computational notebook in a graph form comprising a plurality of nodes and a plurality of links linking the nodes, the nodes comprising representations of the plurality of cells;
   generating a user interface projected on a display, the user interface comprising a first visualization of the first interface adjacent to a second visualization of the second interface; and
   generating a visual path through the nodes and links on the second interface based on executing of the plurality of cells in the computational notebook, the visual path indicative of an order of the execution of the plurality of cells.

2. The method of claim 1, further comprising:
   upon a highlighting of one of the plurality of nodes comprising the executable code, extracting the code from one of the plurality of cells corresponding to the one of the plurality of nodes;
   displaying the extracted code corresponding to the one of the plurality of nodes on the display; and
   modifying the one of the plurality of cells in the first interface according to modifications made to the displayed extracted code.

3. The method of claim 1, further comprising:
   providing, on one or more of corresponding nodes of the second interface and in a background of the interface, an indication of variables utilized in each cell of the plurality of cells.

4. The method of claim 1, further comprising:
   upon a highlighting of one of the plurality of nodes, determining a representation of a chart associated with one of the plurality of cells corresponding to the one of the plurality of nodes; and
   displaying the determined chart corresponding to the one of the plurality of nodes.

5. The method of claim 1, wherein the graph is a force-directed graph, wherein the plurality of nodes are arranged according to similarity of variables used in corresponding cells such that a length of each of the plurality of links is representative of the similarity.

6. The method of claim 1, further comprising:
   providing on the second interface, a time slider configured to provide one or more historical execution snapshots of the computational notebook; and
   displaying the graph form of the computational notebook according to a corresponding one of the one or more historical execution snapshots.

7. A non-transitory computer readable medium, storing instructions for executing a process, the instructions comprising:
   for a first interface of a computational notebook comprising a plurality of cells, each of the plurality of cells comprising executable code and markdown,
      extracting properties from the executable code and markdown of each of the plurality of cells; and
      building a second interface using the extracted properties, the second interface representing the computational notebook in a graph form comprising a plurality of nodes and a plurality of links linking the nodes, the nodes comprising representations of the plurality of cells;
   generating a user interface projected on a display, the user interface comprising a first visualization of the first interface adjacent to a second visualization of the second interface; and
   for execution of the plurality of cells in the computational notebook, generating a visual path through the nodes and links on the second interface indicative of an order of the execution of the plurality of cells.

8. The non-transitory computer readable medium of claim 7, the instructions further comprising:
upon a highlighting of one of the plurality of nodes comprising the executable code, extracting the code from one of the plurality of cells corresponding to the one of the plurality of nodes;
displaying the extracted code corresponding to the one of the plurality of nodes on the display; and
modifying the one of the plurality of cells in the first interface according to modifications made to the displayed extracted code.

9. The non-transitory computer readable medium of claim 7, the instructions further comprising:
providing, on one or more of corresponding nodes of the second interface and in a background of the interface, an indication of variables utilized in each cell of the plurality of cells.

10. The non-transitory computer readable medium of claim 7, the instructions further comprising:
upon a highlighting of one of the plurality of nodes, determining a representation of a chart associated with one of the plurality of cells corresponding to the one of the plurality of nodes; and
displaying the determined chart corresponding to the one of the plurality of nodes.

11. The non-transitory computer readable medium of claim 7, wherein the graph is a force-directed graph, wherein the plurality of nodes are arranged according to similarity of variables used in corresponding cells such that a length of each of the plurality of links is representative of the similarity.

12. The non-transitory computer readable medium of claim 7, the instructions further comprising:
providing on the second interface, a time slider configured to provide one or more historical execution snapshots of the computational notebook; and
displaying the graph form of the computational notebook according to a corresponding one of the one or more historical execution snapshots.

13. An apparatus, comprising:
a processor, configured to:
for a first interface of a computational notebook comprising a plurality of cells, each of the plurality of cells comprising of executable code and markdown, extract properties from the executable code and markdown of each of the plurality of cells, and build a second interface using the extracted properties, the second interface representing the computational notebook in a graph form comprising a plurality of nodes and a plurality of links linking the nodes, the nodes comprising representations of the plurality of cells;
generate a user interface projected on a display, the user interface comprising a first visualization of the first interface adjacent to a second visualization of the second interface; and
for execution of the plurality of cells in the computational notebook, generate a visual path through the nodes and links on the second interface indicative of an order of the execution of the plurality of cells.

14. The apparatus of claim 13, the processor further configured to:
upon a highlighting of one of the plurality of nodes comprising the executable code, extract the code from one of the plurality of cells corresponding to the one of the plurality of nodes;
display the extracted code corresponding to the one of the plurality of nodes on the display; and
modify the one of the plurality of cells in the first interface according to modifications made to the displayed extracted code.

15. The apparatus of claim 13, the processor further configured to:
provide, on one or more of corresponding nodes of the second interface and in a background of the interface, an indication of variables utilized in each cell of the plurality of cells.

16. The apparatus of claim 13, the processor further configured to:
upon a highlighting of one of the plurality of nodes, determine a representation of a chart associated with one of the plurality of cells corresponding to the one of the plurality of nodes; and
display the determined chart corresponding to the one of the plurality of nodes.

17. The apparatus of claim 13, wherein the graph is a force-directed graph, wherein the plurality of nodes are arranged according to similarity of variables used in corresponding cells such that a length of each of the plurality of links is representative of the similarity.

18. The apparatus of claim 13, the processor further configured to:
provide on the second interface, a time slider configured to provide one or more historical execution snapshots of the computational notebook; and
display the graph form of the computational notebook according to a corresponding one of the one or more historical execution snapshots.

* * * * *